United States Patent Office 3,814,587
Patented June 4, 1974

3,814,587
METHOD FOR MONITORING AN AQUEOUS STREAM FOR THE PRESENCE OF FLUOROCARBONS
William S. Pappas, Oak Ridge, Tenn., assignor to the United States of America as represented by the United States Atomic Energy Commission
No Drawing. Filed Jan. 15, 1973, Ser. No. 323,499
Int. Cl. G01n 33/18
U.S. Cl. 23—230 M                 8 Claims

ABSTRACT OF THE DISCLOSURE

A method for monitoring a stream of cooling water for the presence of minute concentrations (e.g., 2 p.p.b.) of fluorocarbon. A stream of the cooling water is passed in fluorocarbon-exchanging contact with a selected trapped volume of gas, preferably for a time sufficient to establish equilbrium between the gas and water phases. Because of the preferential concentration of the fluorocarbon in the trapped gas, the presence of the fluorocarbon therein can be readily detected with conventional instrumentation.

BACKGROUND OF THE INVENTION

This invention was made in the course of, or under, a contract with the United States Atomic Energy Commission.

This invention relates to methods for monitoring an aqueous stream for the presence of trace amounts of a fluorocarbon.

In various industrial processes, a stream of a fluorocarbon and a stream of water are passed through heat-exchange apparatus to effect heat transfer therebetween. For example, in some cooling systems a stream of dichlorotetrafluoroethane vapor is fed into a shell-and-tube heat exchanger for cooling by a stream of recirculated water. A leak in the heat exchanger tubing normally results in inleakage of the fluorocarbon into the recirculating water. It is, of course, highly desirable to detect such leaks while they are in the incipient state—i.e., during the initial period of leakage, when the concentration of the fluorocarbon in the water is extremely low. Early detection permits corrective action to be taken early enough to minimize fluorocarbon losses as well as equipment downtime.

Previously, streams of cooling water have been monitored for the presence of fluorocarbon by a hydrolysis technique which is undesirably complex and time-consuming. In that technique, a sample of the cooling water is made alkaline with sodium hydroxide and then distilled with a small flow of oxygen bubbling through the sample. The resulting vapor is passed through a combustion tube furnace, where the organic fluoride is converted to hydrogen fluoride. The latter is caught in the condensate and analyzed for fluoride ion content by means of a colorimetric procedure.

SUMMARY OF THE INVENTION

Accordingly, it is an object of this invention to provide an improved, comparatively simple method for monitoring a stream of aqueous coolant for the presence of minute amounts of fluorocarbon.

It is another object to provide a method of monitoring whereby minute amounts of a fluorocarbon in water can be detected, in a compartively short sampling interval, with detectors having only moderate sensitivity to the fluorocarbon.

Other objects will be ascertained from the following description and claims.

This invention can be sumarized as follows: In a process wherein an aqueous stream and a stream of fluorocarbon are passed through heat exchange apparatus to effect heat transfer therebetween, the method of monitoring aqueous-stream effluent from said apparatus for the presence of fluorocarbon comprising passing a stream of said effluent in fluorocarbon-exchanging contact with a selected trapped volume of gas substantially non-reactive with said stream, thereby distributing said fluorocarbon between said stream and said gas, and detecting the presence of said fluorocarbon in said volume of gas.

DESCRIPTION OF THE PREFERRED EMBODIMENT

This invention is directed toward monitoring an aqueous stream for the inleakage of fluorocarbons—ie., organic compounds in which most of all of the hydrogen directly attached to carbon has been replaced by fluorine. The following are a few examples of such compounds: dichlorotetrafluoroethane ($CClF_2CClF_2$); trichloromonofluoromethane ($CCl_3F$); perfluorodimethylcyclohexane ($C_8F_{16}$); chloropentafluoroethane ($CClF_2CF_3$); and tetrafluoromethane ($CF_4$). As used herein, the term "aqueous stream" refers to essentially pure water or water containing various additives—corrosion inhibitors and algicides, for example.

This simple and effective method of monitoring is based on the typically great difference in the solubility of fluorocarbons in water and in selected gases, such as air. That is, this method takes advantage of the typically high distribution coefficient, or partition coefficient, of fluorocarbons in a system comprising the selected gas and water. For example, the application of Henry's law to published data on the solubility of $CClF_2CClF_2$ gives an air-to-water molar distribution coefficient of approximately 151,500:1, at 127° F. The following is an example of how the method takes advantage of this high distribution coefficient to monitor a stream of water for inleakage of $$CClF_2CClF_2.$$

The stream of water referred to in this example had previously been passed through a heat exchanger to cool a stream of $CClF_2CClF_2$.

EXAMPLE

A header containing recirculating cooling water was monitored for the presence of $CClF_2CClF_2$ by diverting from the header a sample stream having a flow rate of one gallon a minute. This stream was directed through an enclosure to contact a 100-milliliter sample of air trapped therein. In the enclosure the stream of water was fed through a conventional aspirator, which was connected to circulate the trapped air through the water. The contacting procedure was conducted for ten minutes (at 149° F.) to establish equilibrium between the two phases, after which the trapped sample of air was analyzed for the fluorocarbon by means of a standard mass spectrometer. The spectrometer gave a prompt and definite indication of the presence of $CClF_2CClF_2$. To obtain an indication of the sensitivity of this method of monitoring, the above-mentioned pyrohydrolysis procedure was used to determine the $CClF_2CClF_2$ concentration in the cooling water in the header, and the spectrometer was used to determine the actual concentration of the fluorocarbon in the trapped sample of air. These concentrations were found to be as follows: cooling water, 2.6±1 molar p.p.b. (25 wt. p.p.b.) $CClF_2CClF_2$; air sample, 400,000 molar p.p.b.

$$CClF_2CClF_2$$

Thus, the sampling procedure had increased the concentration of fluorocarbon in the air sample to a value about 150,000 times its concentration in the cooling water. It was this increase in concentration which made it possible to use the spectrometer as a means of monitoring the cooling water in the manner described.

It will be understood that the preceding example is presented only as an illustration of the preferred form of this method of monitoring and that the invention is not limited to any particular sample flow, trapped air (gas) volume, or equilibration time. In most applications it is desirable to operate under conditions promoting equilibration, and thus relatively large sample flows (e.g., a gallon or more per minute) and small gas volumes (e.g., 1–1000 ml.) are preferred. If desired, the equilibration time can be reduced by promoting intimate contact between the aqueous stream and the gas sample. This can be accomplished by means of any suitable contacting technique, such as passing the water through an aspirator, as mentioned above.

This method is likely to be used most for the detection of minute concentrations of fluorocarbons—i.e., in applications where an equilibration period is required to provide a readily detectable concentration of fluorocarbon in the gas sample. In some applications, however, the method does not require contacting the water sample and the gas sample for a time sufficient to establish equilibrium. This would be the case where immediate detection of the inleakage of fluorocarbon is not critical and some buildup of the fluorocarbon in the cooling water is permissible. In such applications, the fluorocarbon may reach a readily detectable concentration in the gas well prior to attainment of equilibrium.

It will be understood that the step of detecting the presence in the gas sample of the fluorocarbon of interest can be conducted by any appropriate technique and with any suitable instrument. The instrument may, like a halogen leak detector, be responsive to a constituent of the fluorocarbon; or it may, like an infrared analyzer, be responsive to the fluorocarbon molecule as a whole. The following are examples of a few of the many conventional instruments which can be used to indicate the presence of the fluorocarbon in the trapped sample of gas: infrared analyzers, mass spectrometers, thermal conductivity analyzers, and gas chromatographs. In most applications, the detector need be adapted only to indicate, or give warning of, the presence of the fluorocarbon. If desired, however, the instrumentation may be adapted to display the fluorocarbon concentration in the air sample. Again, the instrument may be calibrated to display the fluorocarbon concentration in the cooling water.

For brevity, this invention has been illustrated in terms of equilibrating a trapped volume of air and a flowing sample of the aqueous stream. If desired, however, any gas essentially non-reactive with the aqueous stream may be substituted for the air. Examples of other suitable gases include the noble gases as well as nitrogen.

This method of monitoring is applicable to fluorocarbons in general, since fluorocarbons as a class are characterized by much lower solubility in water than in gases. As an example, at a temperature of 127° F. and a pressure of one atmosphere, $CClF_2CClF_2$ has a solubility in water of only 0.00066 mole percent, by weight. Under those conditions, the theoretical air-to-water distribution coefficient for that fluorocarbon is about 151,000:1, as calculated from the following formula:

$$K = C_g/C_e$$

where $C_g$ = molar concentration in gas phase
$C_e$ = molar concentration in water at equilibrium
$K$ = distribution coefficient.

The following table lists similarly calculated air-to-water distribution coefficients for several other fluorocarbons.

TABLE

| Fluorocarbons: | Air-to-water distribution coefficients (77° F., one atmosphere) |
|---|---|
| Trichloromonofluoromethane ($CCl_3F$) | 6,900 |
| Dichlorodifluoromethane ($CCl_2F_2$) | 24,000 |
| Chlorotrifluoromethane ($CClF_3$) | 65,000 |
| Tetrafluoromethane ($CF_4$) | 326,000 |
| Chloropentafluoroethane ($CClF_2CF_3$) | 143,000 |
| Perfluorodimethylcyclohexane ($C_8F_{16}$) | 40,000 |

What is claimed is:

1. In a process wherein an aqueous stream and a stream of fluorocarbon are passed through heat exchange apparatus to effect heat transfer therebetween, the method of monitoring aqueous-stream effluent from said apparatus for the presence of fluorocarbon comprising passing a stream of said effluent in fluorocarbon-exchanging contact with a selected trapped volume of gas substantially non-reactive with said stream, thereby distributing said fluorocarbon between said stream and said gas, and detecting the presence of said fluorocarbon in said volume of gas.

2. The method of claim 1 wherein said volume of gas is contacted with said stream for a time sufficient to establish equilbrium therebetween.

3. The method of claim 1 wherein said gas is a member of the group consisting of the noble gases, nitrogen, and air.

4. The method of claim 1 wherein said fluorocarbon is a fluorinated hydrocarbon.

5. The method of claim 1 wherein the presence of said fluorocarbon in said volume of gas is detected by subjecting said gas to infrared analysis.

6. The method of claim 1 wherein the presence of said fluorocarbon in said volume of gas is detected by subjecting said gas to thermal conductivity analysis.

7. The method of claim 1 wherein the presence of said fluorocarbon in said volume of gas is detected by subjecting said gas to mass spectrometric analysis.

8. The method of claim 1 wherein the presence of said fluorocarbon in said volume of gas is detected by sensing halogen therein.

References Cited

UNITED STATES PATENTS

| 1,990,706 | 2/1935 | Midgley, Jr. | 23—230 L |
| 2,096,099 | 10/1937 | Gaugler | 23—230 L |
| 2,927,005 | 3/1960 | O'Brien | 23—230 L |
| 3,522,008 | 7/1970 | Defabaugh et al. | 23—230 L |

RONALD E. SERWIN, Primary Examiner

U.S. Cl. X.R.

23—230 L, 230 R